United States Patent
Tashiro et al.

(10) Patent No.: US 10,442,274 B2
(45) Date of Patent: Oct. 15, 2019

(54) EJECTOR REFRIGERATION CYCLE DEVICE AND LOW OUTSIDE TEMPERATURE OPERATION THEREOF

(71) Applicant: DENSO CORPORATION, Kariya, Aichi-pref. (JP)

(72) Inventors: Toshiyuki Tashiro, Kariya (JP); Masahiro Yamada, Kariya (JP); Makoto Kume, Kariya (JP); Haruyuki Nishijima, Kariya (JP); Youhei Nagano, Kariya (JP); Yoshiyuki Yokoyama, Kariya (JP); Yoshinori Araki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 266 days.

(21) Appl. No.: 15/513,496

(22) PCT Filed: Aug. 18, 2015

(86) PCT No.: PCT/JP2015/004095
§ 371 (c)(1),
(2) Date: Mar. 22, 2017

(87) PCT Pub. No.: WO2016/063443
PCT Pub. Date: Apr. 28, 2016

(65) Prior Publication Data
US 2017/0297416 A1 Oct. 19, 2017

(30) Foreign Application Priority Data
Oct. 24, 2014 (JP) .................................. 2014-217457

(51) Int. Cl.
*B60H 1/32* (2006.01)
*F25B 27/00* (2006.01)
(Continued)

(52) U.S. Cl.
CPC ............ *B60H 1/3211* (2013.01); *F25B 27/00* (2013.01); *F25B 41/00* (2013.01); *F25B 41/062* (2013.01);
(Continued)

(58) Field of Classification Search
CPC ..... B60H 2001/3298; F25B 2341/0012; F25B 2341/0014; F25B 2700/2106
See application file for complete search history.

(56) References Cited

U.S. PATENT DOCUMENTS 6,477,857 B2   11/2002  Takeuchi et al.
2004/0255612 A1*  12/2004  Nishijima ............... F25B 41/00
                                                        62/500

(Continued)

FOREIGN PATENT DOCUMENTS

JP         2013177879 A    9/2013
WO    WO-2013132769 A1 *  9/2013 ............... F04F 5/20

(Continued)

OTHER PUBLICATIONS

U.S. Appl. No. 15/513,508, filed Mar. 22, 2017, Kume et al.
U.S. Appl. No. 15/513,469, filed Mar. 22, 2017, Araki et al.

*Primary Examiner* — Jonathan Bradford
(74) *Attorney, Agent, or Firm* — Harness, Dickey & Pierce, P.L.C.

(57) ABSTRACT

An ejector refrigeration cycle device includes: a radiator that dissipates heat from a refrigerant discharged from a compressor; an ejector module that decompresses the refrigerant cooled by the radiator; and an evaporator that evaporates a liquid-phase refrigerant separated in a gas-liquid separation space of the ejector module. A grille shutter is disposed as an inflow-pressure increasing portion between the radiator and a cooling fan blowing the outside air toward the radiator. The grille shutter is operated to decrease the volume of the outside air to be blown toward the radiator when an outside (Continued)

air temperature is equal to or lower than a reference outside air temperature, thereby increasing the pressure of the inflow refrigerant to flow into a nozzle passage of the ejector module.

12 Claims, 9 Drawing Sheets

(51) Int. Cl.
    *F25B 41/00*     (2006.01)
    *F25B 41/06*     (2006.01)
    *F25B 49/02*     (2006.01)
    *F25B 40/02*     (2006.01)

(52) U.S. Cl.
    CPC ...... *F25B 49/02* (2013.01); *B60H 2001/3255* (2013.01); *B60H 2001/3277* (2013.01); *B60H 2001/3285* (2013.01); *B60H 2001/3298* (2013.01); *F25B 40/02* (2013.01); *F25B 2327/001* (2013.01); *F25B 2341/0012* (2013.01); *F25B 2341/0014* (2013.01); *F25B 2400/0403* (2013.01); *F25B 2400/0417* (2013.01); *F25B 2400/121* (2013.01); *F25B 2400/23* (2013.01); *F25B 2500/18* (2013.01); *F25B 2600/2501* (2013.01); *F25B 2700/1931* (2013.01); *F25B 2700/2104* (2013.01); *F25B 2700/2106* (2013.01); *F25B 2700/2117* (2013.01)

(56) References Cited

U.S. PATENT DOCUMENTS

| | | | |
|---|---|---|---|
| 2004/0255613 A1* | 12/2004 | Choi | F25B 41/00 62/500 |
| 2005/0011221 A1 | 1/2005 | Hirota | |
| 2010/0162751 A1* | 7/2010 | Nishijima | F25B 1/10 62/500 |
| 2015/0033790 A1 | 2/2015 | Yamada et al. | |
| 2015/0345840 A1 | 12/2015 | Yokoyama et al. | |
| 2016/0200170 A1 | 7/2016 | Kawamoto et al. | |

FOREIGN PATENT DOCUMENTS

| WO | WO-2016051646 A1 | 4/2016 |
|---|---|---|
| WO | WO-2016063441 A1 | 4/2016 |

* cited by examiner

NORMAL OPERATION

LOW OUTSIDE-AIR TEMPERATURE OPERATION

LOW OUTSIDE-AIR TEMPERATURE OPERATION

EJECTOR REFRIGERATION CYCLE DEVICE AND LOW OUTSIDE TEMPERATURE OPERATION THEREOF

CROSS REFERENCE TO RELATED APPLICATIONS

This application is a U.S. National Phase Application under 35 U.S.C. 371 of International Application No. PCT/JP2015/004095 filed on Aug. 18, 2015 and published in Japanese as WO 2016/063443 A1 on Apr. 28, 2016. This application is based on and claims the benefit of priority from Japanese Patent Application No. 2014-217457 filed on Oct. 24, 2014. The entire disclosures of all of the above applications are incorporated herein by reference.

FIELD OF THE INVENTION

The present disclosure relates to an ejector refrigeration cycle device that includes an ejector serving as a refrigerant decompression portion.

BACKGROUND ART

Conventionally, an ejector refrigeration cycle device is known to be a vapor compression refrigeration cycle device including an ejector as a refrigerant decompression portion.

In this kind of ejector, a high-pressure refrigerant is isentropically decompressed by and injected from a nozzle portion. By the suction effect of the injection refrigerant, another refrigerant is drawn from an outlet side of an evaporator, thereby recovering the loss of kinetic energy caused when decompressing the refrigerant at the nozzle portion. The recovered energy (recovery energy) is converted to pressure energy in a diffuser (pressurizing portion) of the ejector, thereby pressurizing the refrigerant. Note that the recovery energy is sometimes called expansion energy.

Furthermore, in the ejector refrigeration cycle device, the refrigerant pressurized by the diffuser is guided to a suction side of a compressor, thereby making it possible to increase the pressure of the suction refrigerant to a higher level than in a normal refrigeration cycle device in which a refrigerant evaporation pressure in an evaporator becomes substantially equal to a pressure of the suction refrigerant drawn into the compressor. Thus, the ejector refrigeration cycle device can reduce the power consumption by the compressor to improve a coefficient of performance (COP) of the cycle, compared with the normal refrigeration cycle device.

Patent Document 1 discloses an ejector refrigeration cycle device that includes an ejector with a swirl space as a swirl-flow generating portion for causing a swirling flow in a subcooled liquid-phase refrigerant flowing into a nozzle portion.

In the ejector disclosed in Patent Document 1, the subcooled liquid-phase refrigerant is swirled in the swirl space to decompress and boil the refrigerant on a swirl center side, so that the refrigerant is converted into a two-phase separated state that contains a larger amount of the gas-phase refrigerant on the swirl center side rather than in an outer region of the swirl space. By allowing such a refrigerant in the two-phase separated state to flow into a nozzle passage (nozzle portion), the boiling of the refrigerant is promoted in the nozzle passage, thereby improving energy conversion efficiency when converting the pressure energy of the refrigerant to kinetic energy in the nozzle passage.

RELATED ART DOCUMENT

Patent Document

Patent Document 1: Japanese Unexamined Patent Application Publication No. 2013-177879

SUMMARY OF INVENTION

As mentioned above, the ejector draws the refrigerant by the suction effect of the injection refrigerant. For this reason, if the flow rate and flow velocity of the injection refrigerant are decreased, a suction capacity of the ejector for drawing the refrigerant from the outlet side of the evaporator might be reduced. Thus, for example, in the ejector refrigeration cycle device applied to the air conditioner, the suction capacity of the ejector is reduced on an operating condition in which a thermal load of the cycle is relatively low, like a dehumidification heating operation executed at a low outside-air temperature.

Furthermore, the amount of the recovery energy by the ejector is represented by a decrease in the enthalpy of the refrigerant when the refrigerant is isentropically decompressed by the nozzle portion (that is, by a difference in enthalpy obtained by subtracting an enthalpy of the injection refrigerant immediately after injection of the refrigerant out of the nozzle portion, from an enthalpy of the inflow refrigerant flowing into the nozzle portion). Like the ejector refrigeration cycle device of Patent Document 1, in a cycle for allowing the subcooled liquid-phase refrigerant with a relatively low enthalpy to flow into a nozzle passage (nozzle portion), the amount of recovery energy tends to be decreased.

Therefore, in the ejector refrigeration cycle device that allows the subcooled liquid-phase refrigerant to flow into the nozzle portion of the ejector, the suction capacity of the ejector tends to significantly reduce on an operating condition in which the thermal load of the cycle is relatively low, at a low outside-air temperature. For this reason, the refrigerant cannot flow into the evaporator at the low outside-air temperature, which might make it impossible to cool a cooling target fluid by the evaporator.

The present disclosure has been made in view of the foregoing matters, and it is an object of the present disclosure to exhibit an adequate cooling capacity regardless of the operating condition, in an ejector refrigeration cycle device that causes the subcooled liquid-phase refrigerant to flow into a nozzle portion of the ejector.

An ejector refrigeration cycle device according to a first aspect of the present disclosure includes: a compressor that compresses and discharges a refrigerant; a radiator that exchanges heat between the high-pressure refrigerant discharged from the compressor and outside air; an ejector including a body portion, the body portion being provided with a nozzle portion that decompresses the refrigerant flowing out of the radiator, a refrigerant suction port that draws a refrigerant by a suction effect of the injection refrigerant injected from the nozzle portion at a high velocity, and a pressurizing portion that mixes the injection refrigerant with the suction refrigerant drawn from the refrigerant suction port to pressurize the mixed refrigerant; an evaporator that evaporates the refrigerant, and allows the evaporated refrigerant to flow to the refrigerant suction port; an outside air temperature detector that detects a temperature of the outside air; and an inflow-pressure increasing portion that increases a pressure of an inflow refrigerant flowing into the nozzle portion. The inflow refrigerant is in a subcooled liquid-phase state at least when an outside air temperature detected by the outside air temperature detector is higher than a reference outside air temperature, and the inflow-pressure increasing portion increases the pressure of the inflow refrigerant when the outside air temperature is equal to or lower than the reference outside air temperature.

Therefore, the inflow-pressure increasing portion increases the pressure of the inflow refrigerant when the outside-air temperature is equal to or lower than the reference outside-air temperature. Thus, even under a low outside-air temperature at which the thermal load on the cycle tends to decrease, the flow velocity of the injection refrigerant injected from the nozzle portion can be prevented from decreasing.

Accordingly, even in the ejector refrigeration cycle device that allows the subcooled liquid-phase refrigerant to flow into the nozzle portion when the outside-air temperature is higher than the reference outside-air temperature, the ejector can be prevented from failing to exhibit its suction capacity at a low outside-air temperature.

Thus, the ejector is allowed to exhibit its suction capacity, regardless of the operating condition, thereby enabling the evaporator to exhibit its cooling capacity.

An ejector refrigeration cycle device according to a second aspect of the present disclosure includes: a compressor that compresses and discharges a refrigerant; a radiator that exchanges heat between the high-pressure refrigerant discharged from the compressor and outside air; an ejector including a body portion, the body portion being provided with a nozzle portion that decompresses the refrigerant flowing out of the radiator, a refrigerant suction port that draws a refrigerant by a suction effect of the injection refrigerant injected from the nozzle portion at a high velocity, and a pressurizing portion that mixes the injection refrigerant with the suction refrigerant drawn from the refrigerant suction port to pressurize the mixed refrigerant; an evaporator that evaporates the refrigerant, allowing the evaporated refrigerant to flow out to the refrigerant suction port; an outside air temperature detector that detects a temperature of the outside air; and a vapor-quality increasing portion that converts an inflow refrigerant flowing into the nozzle portion from a subcooled liquid-phase state to a state of having a vapor quality (dryness fraction) of 0 or more. The inflow refrigerant is in the subcooled liquid-phase state at least when an outside air temperature detected by the outside air temperature detector is higher than a reference outside air temperature, and the vapor-quality increasing portion brings the inflow refrigerant into a state of having a vapor quality of 0 or more, when the outside air temperature is equal to or lower than the reference outside air temperature.

Therefore, the vapor-quality increasing portion brings the inflow refrigerant into a state of having the vapor quality of 0 or more when the outside-air temperature is equal to or lower than the reference outside-air temperature. Thus, even under a low outside-air temperature at which the thermal load on the cycle tends to decrease, the enthalpy of the inflow refrigerant can be increased. That is, at a low outside-air temperature, the recovery energy amount of the ejector can be increased.

Accordingly, even in the ejector refrigeration cycle device that allows the subcooled liquid-phase refrigerant to flow into the nozzle portion when the outside-air temperature is higher than the reference outside-air temperature, the ejector can be prevented from failing to exhibit its suction capacity at a low outside-air temperature.

Thus, the ejector is allowed to exhibit its suction capacity, regardless of the operating condition, thereby enabling the evaporator to exhibit its cooling capacity.

The term "state of having a vapor quality of 0 or more" as used herein means not only the gas-liquid two-phase state, but also the state of having a vapor quality of 0, that is, a saturated liquid-phase state.

DESCRIPTION OF EMBODIMENTS

First Embodiment

Figure 1:
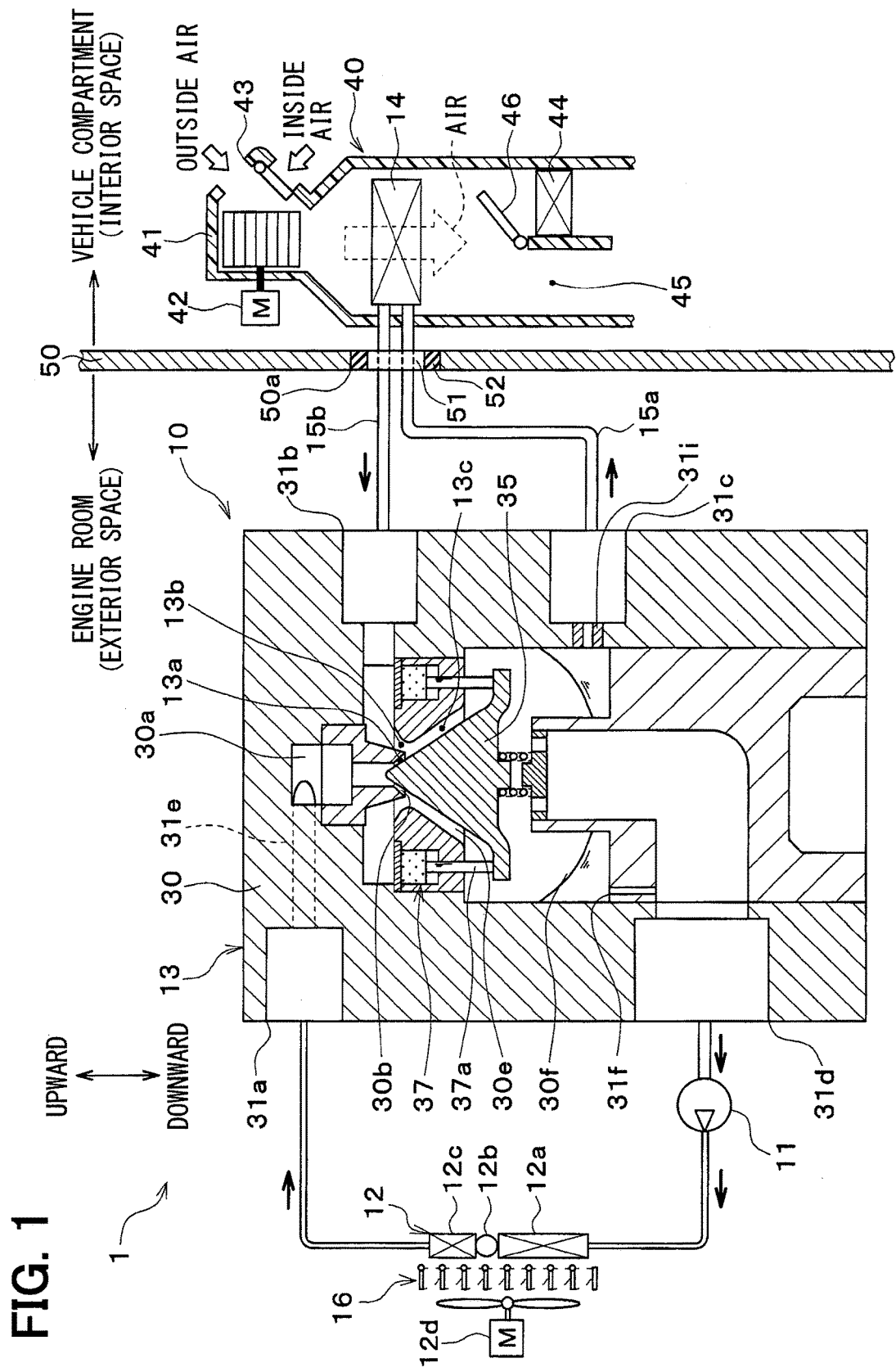
FIG. 1 is an entire schematic configuration diagram of a vehicle air conditioner to which an ejector refrigeration cycle device according to a first embodiment is applied.

A first embodiment of the present disclosure will be described below with reference to FIGS. 1 to 6. As shown in the entire configuration diagram of FIG. 1, an ejector refrigeration cycle device 10 in this embodiment is applied to a vehicle air conditioner 1 and serves to cool ventilation air to be blown into a vehicle interior as a space to be air-conditioned (interior space). Thus, a fluid to be cooled by the ejector refrigeration cycle device 10 is the ventilation air.

The ejector refrigeration cycle device 10 forms a subcritical refrigeration cycle in which a high-pressure side refrigerant pressure does not exceed the critical pressure of the refrigerant, using a hydrofluorocarbon (HFC)-based refrigerant (e.g., R134a) as the refrigerant. Obviously, a hydrofluoroolefin (HFO)-based refrigerant (e.g., R1234yf) or the like may also be adopted as the refrigerant. Further, refrigerating machine oil for lubricating a compressor 11 is mixed into the refrigerant, and part of the refrigerating machine oil circulates through the cycle together with the refrigerant.

Among components of the ejector refrigeration device 10, the compressor 11 draws and pressurizes the refrigerant into a high-pressure refrigerant and then discharges the pressurized refrigerant. The compressor 11 is installed in an engine room together with an internal combustion engine (engine) (not shown) for outputting a traveling driving force. The compressor 11 is driven by a rotational driving force output from the engine via a pulley, a belt, etc.

More specifically, in this embodiment, the compressor 11 adopts a variable displacement compressor that can be configured to adjust a refrigerant discharge capacity by changing its discharge displacement. The discharge displacement (refrigerant discharge capacity) of the compressor 11 is controlled by a control current output from a controller 60, to be described later, to a discharge displacement control valve of the compressor 11.

Here, the term "engine room" as used in this embodiment means an exterior space that accommodates the engine and is enclosed by a vehicle body, a firewall 50 to be described later, and the like. The engine room is also called an engine compartment. A discharge port of the compressor 11 is connected to a refrigerant inflow port of a condensing portion 12a of a radiator 12.

The radiator 12 is a heat-dissipation heat exchanger that cools the refrigerant by exchanging heat between a high-pressure refrigerant discharged from the compressor 11 and a vehicle exterior air (outside air) blown by a cooling fan 12d, thereby dissipating heat from the high-pressure refrigerant. The radiator 12 is installed at the front side of the engine room in the vehicle.

More specifically, the radiator 12 in this embodiment is configured as a so-called subcool condenser that includes the condensing portion 12a, a receiver 12b, and a subcooling portion 12c. The condensing portion 12a condenses the refrigerant by exchanging heat between the high-pressure gas-phase refrigerant discharged from the compressor 11 and the outside air blown from the cooling fan 12d, thereby dissipating heat from the high-pressure gas-phase refrigerant. The receiver 12b separates the refrigerant flowing out of the condensing portion 12a into gas and liquid phase refrigerants to store therein an excessive liquid-phase refrigerant. The subcooling portion 12c subcools the liquid-phase refrigerant by exchanging heat between the liquid-phase refrigerant flowing out of the receiver 12b and the outside air blown by the cooling fan 12d.

A refrigerant inflow port 31a of the ejector module 13 is connected to a refrigerant outflow port of the subcooling portion 12c in the radiator 12. The cooling fan 12d is an electric blower that has the number of revolutions (blown air volume) controlled by a control voltage output from the controller 60.

Further, in this embodiment, a grille shutter 16 is disposed in an outside-air passage formed between the cooling fan 12d and the radiator 12. The grille shutter 16 adjusts the volume of the outside air to exchange heat with the high-pressure refrigerant in the radiator 12, thereby changing the amount of heat dissipated from the high-pressure refrigerant in the radiator 12.

More specifically, the grille shutter 16 of this embodiment includes a plurality of plate doors and an electric actuator for driving the grille shutter that rotatably displaces the plate doors in cooperation with each other.

When the electric actuator rotatably displaces the plate doors to increase an air passage area of the outside-air passage, the volume of the outside air to exchange heat with the high-pressure refrigerant in the radiator 12 is increased, so that the amount of heat dissipated from the high-pressure refrigerant in the radiator 12 can be increased. On the other hand, when the electric actuator rotatably displaces the plate doors to decrease the air passage area of the outside-air passage, the volume of the outside air to exchange heat with the high-pressure refrigerant in the radiator 12 is decreased, so that the amount of heat dissipated from the high-pressure refrigerant in the radiator 12 can be reduced.

The grille shutter 16 changes the amount of heat dissipated from the high-pressure refrigerant in the radiator 12 in this way, and thereby can adjust the condensation amount of the high-pressure refrigerant by the radiator 12. The condensation amount of the refrigerant is then decreased, thereby enabling an increase in the pressure of the inflow refrigerant flowing from the refrigerant inflow port 31a to the nozzle passage 13a side in the ejector module 13. Therefore, the grille shutter 16 of this embodiment configures an inflow-pressure increasing portion.

The grille shutter 16 (specifically, electric actuator for driving the grille shutter) has its operation controlled by a control signal output from the controller 60.

The ejector module 13 functions as a refrigerant decompression portion that decompresses the high-pressure liquid-phase refrigerant in the subcooled state flowing out of the radiator 12, and also as a refrigerant circulation portion (refrigerant transport portion) that draws (transports) the refrigerant flowing out of an evaporator 14, to be described later, by a suction effect of the refrigerant flow injected at a high velocity, thereby circulating the refrigerant.

Furthermore, the ejector module 13 in this embodiment also functions as a gas-liquid separator for separating the decompressed refrigerant into gas and liquid phase refrigerants.

That is, the ejector module 13 in this embodiment is configured as a "gas-liquid separator integrated ejector" or a "gas-liquid separating function-equipped ejector". In this embodiment, to clarify a difference from an ejector not having a gas-liquid separator (gas-liquid separation space), an integrated (modularized) configuration of the ejector and gas-liquid separator will be hereinafter referred as the "ejector module".

The ejector module 13 is installed in the engine room, together with the compressor 11 and the radiator 12. Note that the respective up and down arrows in FIG. 1 indicate the respective upward and downward directions with the ejector module 13 mounted on the vehicle. Respective upward and downward directions in which other components are mounted on the vehicle are not limited to the above-mentioned up and down directions. FIG. 1 illustrates a cross-sectional view of the ejector module 13 taken along the axial direction thereof.

More specifically, as shown in FIG. 1, the ejector module 13 in this embodiment includes a body portion 30 formed by a combination of a plurality of components. The body portion 30 is formed of a columnar or prismatic metal member. The body portion 30 includes a plurality of refrigerant inflow ports, a plurality of internal spaces, and the like.

Specifically, the refrigerant inflow/outflow ports formed in the body portion 30 include the refrigerant inflow port 31a, a refrigerant suction port 31b, a liquid-phase refrigerant outflow port 31c, and a gas-phase refrigerant outflow port 31d. The refrigerant inflow port 31a allows the refrigerant exiting the radiator 12 to flow thereinto. A refrigerant suction port 31b draws the refrigerant flowing out of the evaporator 14. The liquid-phase refrigerant outflow port 31c allows the liquid-phase refrigerant separated by a gas-liquid separation space 30f formed in the body portion 30 to flow out to the refrigerant inlet side of the evaporator 14. The gas-phase refrigerant outflow port 31d allows the gas-phase refrigerant separated in the gas-liquid separation space 30f to flow out to the suction side of the compressor 11.

The internal spaces formed in the body portion 30 include a swirl space 30a, a decompression space 30b, a pressurizing space 30e, and the gas-liquid separation space 30f. The swirl space 30a serves to swirl the refrigerant flowing thereinto from the refrigerant inflow port 31a. The decompression space 30b serves to decompress the refrigerant flowing out of the swirl space 30a. The pressurizing space 30e serves to allow the refrigerant exiting the decompression space 30b to flow thereinto. The gas-liquid separation space 30f serves to separate the refrigerant flowing out of the pressurizing space 30e into gas and liquid phases.

Each of the swirl space 30a and the gas-liquid separation space 30f is formed to have a substantially columnar rotator shape. Each of the decompression space 30b and the pressurizing space 30e is formed as a substantially conical trapezoidal rotator shape that gradually enlarges its diameter from the swirl space 30a side toward the gas-liquid separation space 30f side. All the central axes of these spaces are arranged coaxially. Note that the rotator shape is a tridimensional shape formed by rotating a plane figure about one straight line (central axis) located on the same plane.

A suction passage 13b is formed in the body portion 30 so as to guide the refrigerant drawn from the refrigerant suction port 31b toward the downstream side of the refrigerant flow in the decompression space 30b and the upstream side of the refrigerant flow in the pressurizing space 30e.

A refrigerant inflow passage 31e that connects the refrigerant inflow port 31a to the swirl space 30a extends in the tangential direction of an inner wall surface of the swirl space 30a as viewed from the central axis direction of the swirl space 30a. Thus, the refrigerant flowing from the refrigerant inflow passage 31e into the swirl space 30a flows along an inner wall surface of the swirl space 30a and then swirls around the central axis of the swirl space 30a.

A centrifugal force acts on the refrigerant swirling within the swirl space 30a, whereby the refrigerant pressure on the central axis side of the swirl space 30 becomes lower than the refrigerant pressure on the peripheral side thereof. Thus, in this embodiment, during the normal operation of the ejector refrigeration cycle device 10, the refrigerant pressure on the central axis side in the swirl space 30a is reduced to a pressure at which the refrigerant becomes a saturated liquid-phase refrigerant, or a pressure at which the refrigerant is decompressed and boiled (causing cavitation).

The adjustment of the refrigerant pressure on the central axis side in the swirl space 30a in this way can be achieved by adjusting the swirl flow velocity of the refrigerant swirling in the swirl space 30a. Furthermore, the adjustment of the swirl flow velocity can be performed, for example, by adjusting the ratio of the passage cross-sectional area of the refrigerant inflow passage 31e to the cross-sectional area of the swirl space 30a in a direction perpendicular to the axis direction. Note that the swirl flow velocity in this embodiment means a flow velocity in the swirl direction of the refrigerant located in the vicinity of the most peripheral part of the swirl space 30a.

A passage formation member 35 is formed within the decompression space 30b and the pressurizing space 30e. The passage formation member 35 is formed in a substantially conical shape that expands as toward the outer peripheral side as the passage formation member 35 is spaced apart from the decompression space 30b. The central axis of the passage formation member 35 is arranged coaxially with the central axis of the decompression space 30b and the like.

A refrigerant passage having an annular cross-sectional shape in the direction perpendicular to the axial direction (a doughnut shape obtained by removing a small-diameter circle from a circle arranged coaxially therewith) is formed between the inner peripheral surface of a part forming the decompression space 30b and pressurizing space 30e of the body portion 30 and a conical side surface of the passage formation member 35.

In such a refrigerant passage, a refrigerant passage part between a part forming the decompression space 30b of the body portion 30 and the tip side part of the conical side surface of the passage formation member 35 is formed to have its passage cross-sectional area throttled as toward the downstream side of the refrigerant flow. The refrigerant passage part with this shape configures a nozzle passage 13a serving as a nozzle portion that isentropically decompresses and injects the refrigerant.

More specifically, the nozzle passage 13a in this embodiment is formed to gradually decrease its passage cross-sectional area from the inlet side of the nozzle passage 13a toward the minimum passage area portion thereof, and to gradually enlarge its passage cross-sectional area from the minimum passage area portion toward the outlet side of the nozzle passage 13a. That is, the nozzle passage 13a in this embodiment changes its refrigerant passage cross-sectional area, like a so-called Laval nozzle.

Here, the above-mentioned swirl space 30a is disposed above the nozzle passage 13a and on the upstream side of the refrigerant flow relative to the nozzle passage 13a. Thus, in the swirl space 30a of this embodiment, the subcooled liquid-phase refrigerant flowing into the nozzle passage 13a is allowed to swirl around the axis of the nozzle passage 13a. Therefore, in this embodiment, a part of the body 30 forming the swirl space 30a as well as the swirl space 30a configure a swirling-flow generating portion. In other words, in this embodiment, the ejector and the swirling-flow generating portion are configured integrally.

On the other hand, another refrigerant passage part between a part forming the pressurizing space 30e of the body portion 30 and a part on the downstream side of the conical side surface of the passage formation member 35 is formed to gradually enlarge its passage cross-sectional area toward the downstream side of the refrigerant flow. The refrigerant passage part with this shape configures a diffuser passage 13c that serves as a diffuser portion (pressurizing portion) pressurizing a mixture of an injection refrigerant injected from the nozzle passage 13a and a suction refrigerant drawn from the refrigerant suction port 31b.

In the body portion 30, an element 37 is disposed as a driving device for displacing the passage formation member 35 to change the passage cross-sectional area of the minimum passage area portion of the nozzle passage 13a.

More specifically, the element 37 includes a diaphragm that is designed to be displaceable depending on the temperature and pressure of the refrigerant circulating through the suction passage 13b (that is, the refrigerant flowing out of the evaporator 14). The displacement of the diaphragm is transferred to the passage formation member 35 via an operation stick 37a, thereby vertically displacing the passage formation member 35.

The element 37 displaces the passage formation member 35 in the direction (downward in the vertical direction) that enlarges the passage cross-sectional area of the minimum passage area portion with increasing temperature (degree of superheat) of the refrigerant flowing out of the evaporator 14. On the other hand, the element 37 displaces the passage formation member 35 in the direction (upward in the vertical direction) that reduces the passage cross-sectional area of the minimum passage area portion with decreasing temperature (degree of superheat) of the refrigerant flowing out of the evaporator 14.

In this embodiment, the element 37 displaces the passage formation member 35 depending on the degree of superheat of the refrigerant flowing out of the evaporator 14 in this way. Thus, the passage cross-sectional area of the minimum passage area portion of the nozzle passage 13a is adjusted such that the degree of superheat of the refrigerant on the outlet side of the evaporator 14 approaches a predetermined reference degree of superheat.

The gas-liquid separation space 30f is disposed under the passage formation member 35. The gas-liquid separation space 30f configures a centrifugal gas-liquid separator that swirls the refrigerant flowing out of the diffuser passage 13c around its central axis to thereby separate it into gas and liquid phase refrigerants by a centrifugal effect.

Further, in this embodiment, the internal capacity of the gas-liquid separation space 30f is set to a level that can store only a very small amount of excessive refrigerant or cannot substantially retain excessive refrigerant even though the flow rate of refrigerant circulating through the cycle is varied due to fluctuations in the load on the cycle. In this way, this embodiment enables the downsizing of the entire ejector module 13.

An oil returning passage 31f is formed in a part of the body portion 30 that forms the bottom surface of the gas-liquid separation space 30f. The oil returning passage 31f allows the refrigerating machine oil of the separated liquid-phase refrigerant to return to the gas-phase refrigerant passage for connecting the gas-liquid separation space 30f to the gas-phase refrigerant outflow port 31d. The gas-phase refrigerant outflow port 31d is connected to the suction port of the compressor 11.

On the other hand, in the liquid-phase refrigerant passage for connecting the gas-liquid separation space 30f to the liquid-phase refrigerant outflow port 31c, an orifice 31i is provided as a decompressor for decompressing the refrigerant flowing into the evaporator 14. The liquid-phase refrigerant outflow port 31c is connected to the refrigerant inflow port of the evaporator 14 via an inlet pipe 15a.

The evaporator 14 is a heat-absorption heat exchanger that exchanges heat between the low-pressure refrigerant decompressed by the nozzle passage 13a of the ejector module 13 and the ventilation air to be blown to the vehicle interior from the blower 42, thereby evaporating the low-pressure refrigerant to exhibit the heat absorption effect. The evaporator 14 is disposed in a casing 41 of an interior air-conditioning unit 40 to be described later.

Here, in the vehicle of this embodiment, the firewall 50 is provided as a partition plate that separates the vehicle interior from the engine room in the vehicle exterior. The firewall 50 also has the function of reducing heat, sound, and the like to be transferred from the engine room into the vehicle interior. The firewall can also be called a dash panel.

As shown in FIG. 1, the interior air-conditioning unit 40 is disposed on the vehicle inner side relative to the firewall 50. Thus, the evaporator 14 is disposed in the vehicle interior (interior space). A refrigerant outflow port of the evaporator 14 is connected to the refrigerant suction port 31b of the ejector module 13 via an outlet pipe 15b.

Since the ejector module 13 is disposed in the engine room (exterior space) as mentioned above, the inlet pipe 15a and the outlet pipe 15b are disposed to pass through the firewall 50.

More specifically, the firewall 50 is provided with a circular or rectangular through hole 50a that passes through the engine room side and vehicle interior side of the fire wall. The inlet pipe 15a and the outlet pipe 15b are connected to a connector 51, which is a metal member for connection, and integrated with each other. The inlet pipe 15a and the outlet pipe 15b are arranged to pass through a through hole 50a while being integrated together by the connector 51.

At this time, the connector 51 is positioned on the inner peripheral side or in the vicinity of the through hole 50a. A packing 52 made of an elastic member is arranged in a gap between the outer peripheral side of the connector 51 and an opening edge of the through hole 50a. The packing 52 adopted in this embodiment is one formed of an ethylene-propylene-diene copolymer (EPDM) rubber, which is rubber material with excellent heat resistance.

In this way, the packing 52 is arranged to intervene in the gap between the connector 51 and the through hole 50a, thereby preventing water, noise, or the like from leaking from the engine room into the vehicle interior via the gap between the connector 51 and the through hole 50a.

Next, the interior air-conditioning unit 40 will be described. The interior air-conditioning unit 40 is to blow out the ventilation air having its temperature adjusted by the ejector refrigeration cycle device 10, into the vehicle interior. The interior air-conditioning unit 40 is disposed inside a dashboard (instrumental panel) at the foremost portion of the vehicle interior. Further, the interior air-conditioning unit 40 accommodates in the casing 41 forming its outer envelope, a blower 42, the evaporator 14, a heater core 44, an air mix door 46, and the like.

The casing 41 forms an air passage for the ventilation air to be blown into the vehicle interior. The casing 41 is formed of resin (for example, polypropylene) with some elasticity and excellent strength. An inside/outside air switch 43 is disposed on the most upstream side of the ventilation air flow in the casing 41. The inside/outside air switch acts to switch between the inside air (vehicle interior air) and the outside air (vehicle exterior air) to guide the selected air into the casing 41.

The inside/outside air switch 43 continuously adjusts the opening areas of an inside-air introduction port for introducing the inside air into the casing 41 and an outside-air introduction port for introducing the outside air thereinto by means of an inside/outside air switching door, thereby continuously changing the ratio of the volume of the inside air to that of the outside air. The inside/outside air switching door is driven by an electric actuator for the inside/outside air switching door, and the electric actuator has its operation controlled by a control signal output from the controller 60.

The fan (blower) 42 is disposed on the downstream side of the ventilation air flow of the inside/outside air switch 43 so as to blow the air drawn thereinto via the inside/outside air switch 43 toward the vehicle interior. The blower 42 is an electric blower that drives a multi-blade centrifugal fan (sirocco fan) by the electric motor and has the number of revolutions (blown air volume) controlled by a control voltage output from the controller 60.

The evaporator 14 and the heater core 44 are disposed on the downstream side of the ventilation air flow from the blower 42 in this order with respect to the ventilation air flow. In other words, the evaporator 14 is disposed on the upstream side of the ventilation air flow relative to the heater core 44. The heater core 44 is a heating heat exchanger that heats ventilation air by exchanging heat between an engine coolant and the ventilation air passing through the evaporator 14.

A cold-air bypass passage 45 is formed inside the casing 41 to allow the ventilation air passing through the evaporator 14 to flow downstream while bypassing the heater core 44. The air mix door 46 is disposed on the downstream side of the ventilation air flow relative to the evaporator 14 and on the upstream side of the ventilation air relative to the heater core 44.

The air mix door 46 serves as an air-volume-ratio adjustment portion that adjusts the ratio of the volume of the air passing through the heater core 44 to the volume of the air passing through the cold-air bypass passage 45 in the air passing through the evaporator 14. The air mix door 46 is driven by an electric actuator for driving the air-mix door. The electric actuator has its operation controlled by a control signal output from the controller 60.

A mixing space for mixing air passing through the heater core 44 with air passing through the cold-air bypass passage 45 is provided on the downstream side of the air flow of the heater core 44 and on the downstream side of the air flow of the cold-air bypass passage 45. Thus, the air mix door 46 adjusts the air volume ratio, thereby regulating the temperature of the ventilation air (conditioned air) which has been mixed in the mixing space.

Further, on the most downstream side of the ventilation air flow in the casing 41, openings (not shown) are provided for blowing the conditioned air mixed in the mixing space toward the vehicle interior as a space to be air-conditioned. Specifically, the openings include a face opening for blowing the conditioned air toward the upper body of an occupant in the vehicle interior, a foot opening for blowing the conditioned air toward the feet of the occupant, and a defroster opening for blowing the conditioned air toward the inner surface of a windshield of the vehicle.

The face opening, the foot opening, and the defroster opening have their downstream sides of the ventilation air flow connected to a face air outlet, a foot air outlet, and a defroster air outlet (all air outlets not shown) provided in the vehicle compartment, respectively, via ducts forming respective air passages.

A face door for adjusting an opening area of the face opening, a foot door for adjusting an opening area of the foot opening, and a defroster door (all doors not shown) for adjusting an opening area of the defroster opening are disposed on the upstream sides of the ventilation air flow relative to the face opening, the foot opening, and the defroster opening, respectively.

The face door, foot door, and defroster door serve as an air-outlet mode switch for switching an air outlet mode, and are coupled to electric actuators for driving the air-outlet mode doors via a link mechanism and the like and rotated in cooperation with the respective actuators for driving the air-outlet mode doors. Note that each of the electric actuators also has its operation controlled by a control signal output from the controller 60.

Specifically, the air outlet modes include, for example, a face mode, a bi-level mode, a foot mode, and a defroster mode. In the face mode, the face opening is fully opened to blow the ventilation air toward the upper body of the occupant. In the bi-level mode, both the face opening and foot opening are opened to blow the ventilation air toward the upper body and feet of the occupant. In the foot mode, the foot opening is fully opened with the defroster opening opened only by a small opening degree to blow the ventilation air mainly toward the feet of the occupant in the vehicle compartment. In the defroster mode, the defroster opening is fully opened to blow the ventilation air toward the inner surface of the windshield of the vehicle.

Figure 2:
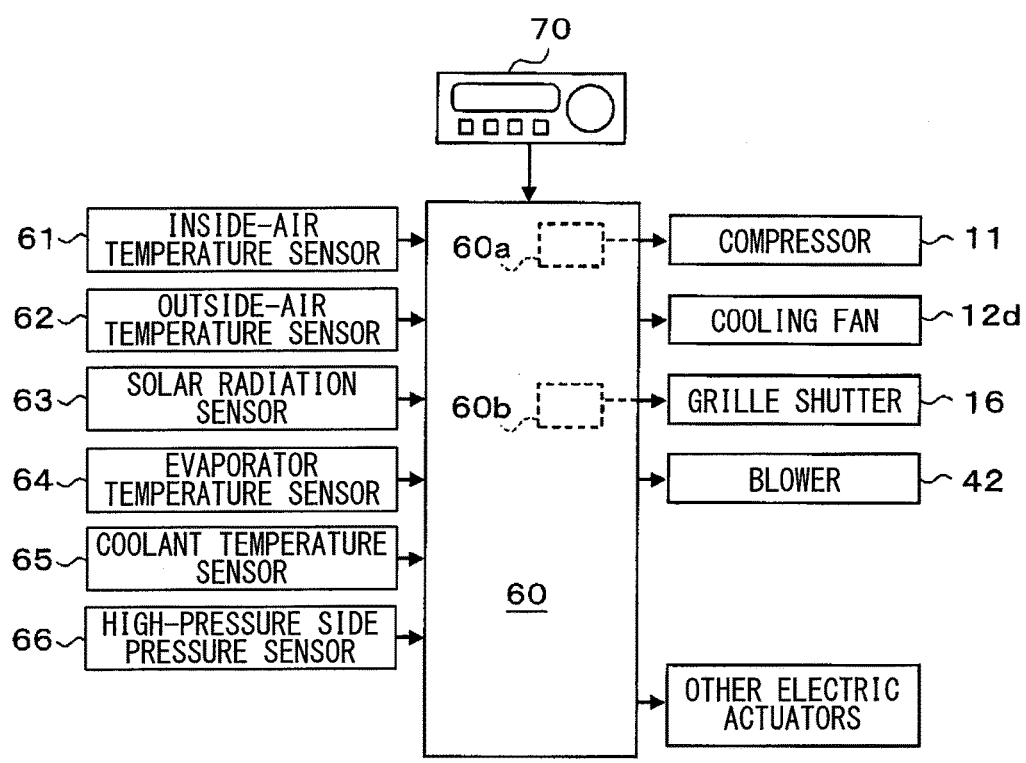
FIG. 2 is a block diagram showing an electric control unit of the vehicle air conditioner in the first embodiment.

Next, an electric control unit in this embodiment will be described with reference to FIG. 2. The controller 60 is configured of a known microcomputer, including CPU, ROM, and RAM, and a peripheral circuit thereof. The controller 60 performs various computations and processing based on an air-conditioning control program stored in the ROM. The controller 60 controls the operations of various electric actuators for the compressor 11, cooling fan 12*d*, grille shutter 16, blower 42, and the like connected to its output side.

A group of sensors for air-conditioning control is connected to the controller 60 and designed to input detection values therefrom to the controller 60. The group of sensors includes an inside-air temperature sensor 61, an outside-air temperature sensor 62, a solar radiation sensor 63, an evaporator temperature sensor 64, a coolant temperature sensor 65, and a high-pressure side pressure sensor 66. The inside-air temperature sensor 61 detects a vehicle interior temperature (inside air temperature) Tr. The outside-air temperature sensor 62 serves as an outside-air temperature detector that detects an outside air temperature Tam. The solar radiation sensor 63 detects the solar radiation amount As within the vehicle interior. The evaporator temperature sensor 64 detects the blown-air temperature (evaporator temperature) Tefin of the air blown from the evaporator 14. The coolant temperature sensor 65 detects the coolant temperature Tw of the engine coolant flowing into the heater core 44. The high-pressure side pressure sensor 66 detects a pressure (high-pressure side refrigerant pressure) Pd of the high-pressure refrigerant discharged from the compressor 11.

The input side of the controller 60 is connected to an operation panel 70 (not shown) disposed near the dashboard at the front of the vehicle compartment. Operation signals from various operation switches provided on the operation panel 70 are input to the controller 60. Various operation switches provided on the operation panel 70 include an automatic switch for setting an automatic control operation of the vehicle air conditioner 1, a vehicle interior temperature setting switch for setting a preset temperature Tset of the vehicle interior, and an air-volume setting switch for manually setting the volume of air from the blower 42.

The controller 60 in this embodiment incorporates therein control units for controlling the operations of various control target devices connected to its output side. In the controller 60, a structure (hardware and software) adapted to control the operation of each control target device serves as the control unit for the corresponding control target device.

For example, in this embodiment, the structure for controlling the operation of the discharge displacement control valve of the compressor 11 configures a discharge-capacity control unit 60*a* for controlling a refrigerant discharge capacity of the compressor 11. The structure for controlling the operation of the grille shutter 16 serving as the inflow-pressure increasing portion configures an inflow-pressure control unit 60*b*. Obviously, the discharge-capacity control unit or the inflow-pressure control unit may be configured as a separate controller with respect to the controller 60.

Figure 3:
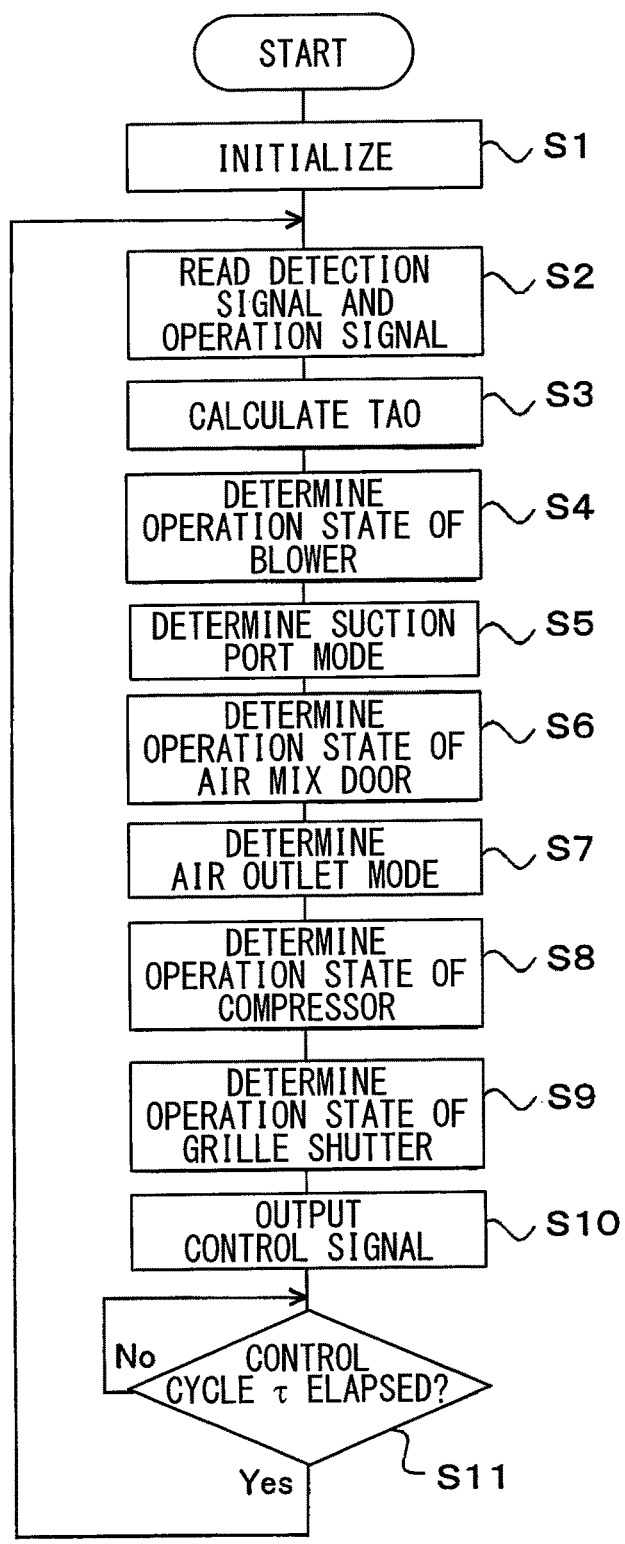
FIG. 3 is a flowchart showing control processing for the vehicle air conditioner in the first embodiment.
Figure 4:
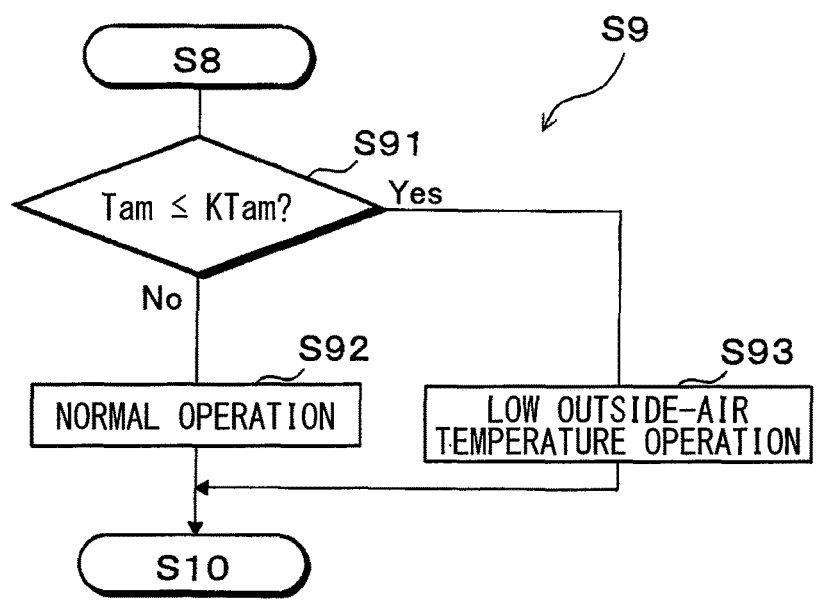
FIG. 4 is a flowchart showing a part of control processing for the vehicle air conditioner in the first embodiment.

Now, the operation of the vehicle air conditioner 1 with the above-mentioned structure in this embodiment will be described based on FIGS. 3 and 4. The flowchart of FIG. 3 shows control processing as a main routine of the air-conditioning control program to be executed by the controller 60. The air-conditioning control program is executed when the automatic switch on the operation panel 70 is turned on.

Further, in the air-conditioning control program of this embodiment, the normal operation is executed when the outside air temperature Tam is higher than a reference outside air temperature KTam, while the low outside-air temperature operation is executed when the outside air temperature Tam is equal to or lower than the reference outside air temperature KTam. Note that the control steps in the flowcharts of FIGS. 3 and 4 serve as various function implementing portions included in the controller 60.

In step S1, first, initialization is performed which includes initializing a flag, a timer, and the like in a memory circuit of the controller 60, and initial alignment of various electric actuators described above. Note that in the initialization at step S1, the controller may read out some of flags and calculated values previously stored when the vehicle air conditioner 1 is stopped or when the vehicle system is shut down.

Then, in step S2, detection signals from the sensor group (61 to 66) for air-conditioning control and operation signals from the operation panel 70 are read in. In subsequent step S3, a target air outlet temperature TAO, which is a target temperature of the ventilation air to be blown into the vehicle interior, is calculated based on the detection signal and operation signal read in step S2.

Specifically, the target air outlet temperature TAO is calculated by the following formula F1:

$$TAO = Kset \times Tset - Kr \times Tr - Kam \times Tam - Ks \times As + C \quad (F1)$$

where Tset is a vehicle interior preset temperature set by the vehicle interior temperature setting switch, Tr is a vehicle interior temperature (inside air temperature) detected by the inside-air temperature sensor 61, Tam is the outside air temperature detected by the outside-air temperature sensor 62, and As is an amount of solar radiation detected by the solar radiation sensor 63. Kset, Kr, Kam, and Ks are control gains, and C is a constant for correction.

In subsequent steps S4 to S9, the control state of each of the control target devices connected to the controller 60 is determined.

In step S4, first, the number of revolutions (blowing capacity) of the blower 42, that is, a blower motor voltage (control voltage) applied to the electric motor of the blower 42 is determined, and the operation proceeds to step S5. Specifically, in step S4, a blower motor voltage is determined with reference to a control map pre-stored in the controller 60 based on the target air outlet temperature TAO determined in step S3.

In more detail, the blower motor voltage is determined in such a manner as to take the substantially maximum value in an ultralow temperature range (maximum cooling range) and an ultrahigh temperature range (maximum heating range) of the target air outlet temperature TAO. Furthermore, the blower motor voltage is determined in such a manner as to gradually decrease from the substantially maximum value as the target air outlet temperature TAO goes from the ultralow temperature range or ultrahigh temperature range to an intermediate temperature range.

Then, in step S5, a suction port mode, that is, a control signal to be output to the electric actuator for the inside/outside air switching door is determined, and then the operation proceeds to step S6. Specifically, in step S5, the suction port mode is determined with reference to the control map pre-stored in the controller 60 based on the target air outlet temperature TAO.

More specifically, the suction port mode is basically determined to be an outside-air mode for introducing the outside air. When the target air outlet temperature TAO is in the ultralow temperature range and a high cooling performance is desired, the suction port mode is determined to be an inside-air mode for introducing the inside air.

Then, in step S6, an opening degree of the air mix door 46, that is, a control signal to be output to the electric actuator for driving the air mix door is determined, and then the operation proceeds to step S7.

Specifically, in step S6, the opening degree of the air mix door 46 is calculated such that the temperature of ventilation air blown into the vehicle interior approaches the target air outlet temperature TAO, based on the evaporator temperature Tefin detected by the evaporator temperature sensor 64, the coolant temperature Tw detected by the coolant temperature sensor 65, and the target air outlet temperature TAO.

Then, in step S7, an air outlet mode, that is, a control signal to be output to the electric actuator for driving an air-outlet mode door is determined, and then the operation proceeds to step S8. Specifically, in step S8, the air outlet mode is determined with reference to the control map pre-stored in the controller 60 based on the target air outlet temperature TAO.

In more detail, the air outlet mode is switched from the foot mode to the bi-level mode and then the face mode in this order as the target air outlet temperature TAO decreases from a high-temperature range to a low-temperature range.

Then, in step S8, the refrigerant discharge capacity of the compressor 11, that is, a control current to be output to the discharge displacement control valve of the compressor 11 is determined, and subsequently the operation proceeds to step S9. Specifically, in step S8, a target evaporator outlet air temperature TEO in the evaporator 14 is determined based on the target air outlet temperature TAO with reference to a control map pre-stored in the controller 60.

The control current to be output to the discharge displacement control valve of the compressor 11 is determined such that the evaporator temperature Tefin approaches the target evaporator outlet air temperature TEO using a feedback control method, based on a deviation between the target evaporator outlet air temperature TEO and the evaporator temperature Tefin detected by the evaporator temperature sensor.

Then, in step S9, the opening degree of the plate doors of the grille shutter 16, that is, a control signal to be output to the electric actuator for driving the grille shutter is determined, and then the operation proceeds to step S10. The details of step S9 will be described below using the flowchart of FIG. 4. First, in step S91 shown in FIG. 4, it is determined whether or not the outside air temperature Tam is equal to or lower than the predetermined reference outside air temperature KTam.

If the outside air temperature Tam is determined not to be equal to or lower than the reference outside air temperature KTam in step S91, the operation proceeds to step S92, in which the grille shutter 16 is brought into the normal operation state, and then the operation proceeds to step S10. More specifically, in step S92, the grille shutter 16 is fully opened. Thus, the radiator 12 during the normal operation can exchange heat between the whole outside air blown from the cooling fan 12d and the high-pressure refrigerant.

On the other hand, if the outside air temperature Tam is determined to be equal to or lower than the reference outside air temperature KTam in step S91, the operation proceeds to step S93, in which the grille shutter 16 is brought into the low outside-air temperature operation state. Subsequently, the operation proceeds to step S10. More specifically, in step S93, the grille shutter 16 is operated to reduce the air passage area of the outside-air passage, thereby decreasing the amount of heat dissipated from the high-pressure refrigerant in the radiator 12, compared to in the normal operation.

Here, in the vapor compression refrigeration cycle device to be applied to the air conditioner, generally, a cooling capacity of ventilation air required for the cycle to exhibit (thermal load on the cycle) becomes lower with decreasing outside air temperature Tam. For example, the thermal load on the cycle is reduced in the dehumidification heating operation and the like in which the ventilation air is cooled and dehumidified under a low outside air temperature, and the dehumidified ventilation air is reheated to be blown into a space to be air-conditioned. Further, when the thermal load on the cycle is lowered, the refrigerant discharge capacity required for the compressor 11 is also reduced.

Therefore, also in the ejector refrigeration cycle device 10 of this embodiment, the refrigerant discharge capacity of the compressor 11 is reduced, and the pressure of the inflow refrigerant flowing into the refrigerant inflow port 31a of the ejector module 13 tends to be lowered at a low outside air temperature.

If the pressure of the inflow refrigerant is decreased, the flow rate and flow velocity of the injection refrigerant injected from the nozzle passage 13a might be decreased, whereby the suction capacity of the ejector module 13 for drawing the refrigerant from the refrigerant suction port 31b might be reduced. For this reason, this embodiment sets the reference outside air temperature KTam at a value slightly higher than the lowest outside air temperature in a range where the ejector module 13 can sufficiently exhibit its suction capacity.

Then, in step S10 shown in FIG. 3, control signals and control voltages are output to various control target devices connected to the output side of the controller 60 so as to achieve the control state determined in steps S4 to S9 described above. In subsequent step S11 the controller is on standby for a control cycle τ, and when the control cycle τ is determined to elapse, the operation is returned to step S2.

That is, in the air-conditioning control program executed by the controller 60 in this embodiment, a routine that includes reading a detection signal and an operation signal, determining the control state of each control target device, and outputting a control signal and control voltage to each control target device in this order is repeated until the stopping of the operation of the vehicle air conditioner 1 is requested. The air-conditioning control program is executed to thereby allow the ejector refrigeration cycle device 10 to operate as follows.

Figure 5:
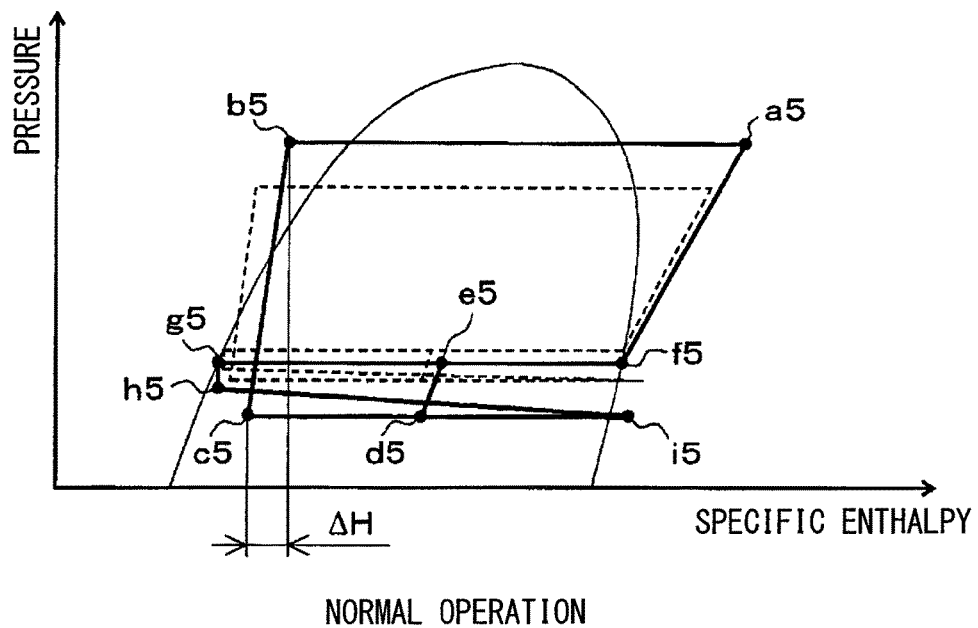
FIG. 5 is a Mollier diagram showing the states of the refrigerant during a normal operation of the ejector refrigeration cycle device in the first embodiment.

As shown in the Mollier diagram indicated by a thick solid line in FIG. 5, the high-temperature and high-pressure refrigerant discharged from the compressor 11 (at point a5 in FIG. 5) flows into the condensing portion 12a of the radiator 12 and exchanges heat with the outside air blown from the cooling fan 12d, thereby dissipating heat therefrom to be condensed. The refrigerant condensed by the condensing portion 12a is separated into gas and liquid phase refrigerants by the receiver 12b. The liquid-phase refrigerant of the gas and liquid phase refrigerants separated by the receiver 12b exchanges heat with the outside air blown from the cooling fan 12d in the subcooling portion 12c, and further dissipates heat therefrom to be converted into the subcooled liquid-phase refrigerant (as indicated from point a5 to point b5 in FIG. 5).

Here, during the normal operation, as shown in control step S92, the grille shutter 16 is fully opened, so that the high-pressure refrigerant can sufficiently have its heat dissipated in the radiator 12 until it becomes a subcooled liquid-phase refrigerant.

The subcooled liquid-phase refrigerant flowing out of the subcooling portion 12c of the radiator 12 flows into the swirl space 30a of the ejector module 13 and further is isentropically decompressed and injected by the nozzle passage 13a formed between the inner peripheral surface of the decompression space 30b and the outer peripheral surface of the passage formation member 35 (as indicated from point b5 to point c5 in FIG. 5). At this time, the passage cross-sectional area of the minimum passage area portion of the nozzle passage 13a is adjusted by an element 37 such that the degree of superheat of the refrigerant on the outlet side of the evaporator 14 (at point i5 in FIG. 5) approaches a reference degree of superheat.

The refrigerant flowing out of the evaporator 14 (at point i5 in FIG. 5) is drawn from the refrigerant suction port 31b into the ejector module 13 by the suction effect of the injection refrigerant injected from the nozzle passage 13a. The injection refrigerant injected from the nozzle passage 13a and the suction refrigerant drawn via the suction passage 13b flow into and are merged in the diffuser passage 13c (as indicated from point c5 to point d5, and from point i5 to point d5 in FIG. 5).

In the diffuser passage 13c, the kinetic energy of the refrigerant is converted into the pressure energy thereof by enlarging the refrigerant passage area. Thus, while the injection refrigerant and suction refrigerant are being mixed together, the mixed refrigerant has its pressure increased (as indicated from point d5 to point e5 in FIG. 5).

The refrigerant flowing out of the diffuser passage 13c is separated by the gas-liquid separation space 30f into gas and liquid phase refrigerants (as indicated from point e5 to point f5 and from point e5 to point g5 in FIG. 5). The liquid-phase refrigerant separated by the gas-liquid separation space 30f is decompressed by the orifice 30i (as indicated from point g5 to point h5 in FIG. 5) and then flows into the evaporator 14.

The refrigerant flowing into the evaporator 14 absorbs heat from the ventilation air blown by the blower 42 to evaporate itself (as indicated from point h5 to point i5 in FIG. 5). In this way, the ventilation air is cooled. On the other hand, the gas-phase refrigerant separated in the gas-liquid separation space 30f flows out of the gas-phase refrigerant outflow port 31d, and is drawn into and compressed again by the compressor 11 (as indicated from point f5 to point a5 in FIG. 5).

At this time, in the interior air conditioning unit 40, the ventilation air cooled by the evaporator 14 flows into a ventilation path on the heater core 44 side as well as the cold-air bypass passage 45 depending on the opening degree of the air mix door 46. The cold air flowing into the ventilation path on the heater core 44 side is reheated when passing through the heater core 44 and then mixed with another cold air passing through the cold-air bypass passage 45 in the mixing space. The conditioned air mixed in the mixing space and having its temperature adjusted is blown into the vehicle interior via the respective air outlets.

Therefore, the vehicle air conditioner 1 in the normal operation blows the ventilation air cooled by the evaporator 14 in the ejector refrigeration cycle device 10, into the vehicle interior, thereby enabling the air-conditioning of the vehicle interior. Further, the ejector refrigeration cycle device 10 of this embodiment draws the refrigerant pressurized by the diffuser passage 13c into the compressor 11, and thus can reduce the driving power for the compressor 11, thereby improving the coefficient of performance (COP) of the cycle.

Further, the ejector module 13 in this embodiment swirls the refrigerant in the swirl space 30a, whereby the refrigerant pressure on the swirl center side of the swirl space 30a is reduced to a pressure at which the refrigerant becomes a saturated liquid-phase refrigerant, or a pressure at which the refrigerant is decompressed and boiled (causing cavitation). The gas-liquid two-phase refrigerant in which a larger amount of gas-phase refrigerant is present on the swirl center side is allowed to flow into the nozzle passage 13a.

Thus, the boiling of the refrigerant in the nozzle passage 13a can be promoted due to wall boiling caused by the friction between the refrigerant and the wall surface of the nozzle passage 13a as well as interface boiling caused by a boiling nucleus generated by the cavitation of the refrigerant on the swirl central side. As a result, the energy conversion efficiency can be improved when converting the pressure energy of the refrigerant into the velocity energy thereof in the nozzle passage 13a.

Next, the low outside-air temperature operation will be described. As mentioned above, in the ejector refrigeration cycle device 10, the thermal load on the cycle becomes lower with decreasing outside air temperature Tam. Thus, as shown in the Mollier diagrams indicated by dashed lines in FIGS. 5 and 6, a pressure difference between the high-pressure side and low-pressure side refrigerant pressures in the cycle is reduced in the low outside-air temperature operation, compared to in the normal operation, thus decreasing the suction capacity of the ejector module 13.

In general ejectors, the refrigerant is drawn from the outlet side of an evaporator, thereby recovering the loss of the kinetic energy caused when decompressing the refrigerant at a nozzle portion. Further, the amount of the energy recovered (recovery energy) by the ejector is represented by a decrease in the enthalpy of the refrigerant when the refrigerant is isentropically decompressed by the nozzle portion.

For example, the amount of the recovery energy by the ejector module 13 during the normal operation is represented by a difference in the enthalpy ($\Delta H$ in FIG. 5) of the refrigerant that is obtained by subtracting an enthalpy of the injection refrigerant (at point c5 in FIG. 5) immediately after being injected from the nozzle passage 13a, from an enthalpy of the inflow refrigerant flowing into the nozzle passage 13a (at point b5 in FIG. 5).

Thus, in a cycle that allows the subcooled liquid-phase refrigerant with a relatively low enthalpy to flow into the nozzle passage 13a, like the ejector refrigeration cycle device 10 of this embodiment, the slope of an isentropic line on the Mollier diagram becomes larger, and the amount of recovery energy tends to be decreased.

Therefore, in the cycle that allows the subcooled liquid-phase refrigerant to flow into the nozzle passage 13a, the suction capacity of the ejector module 13 is significantly reduced on an operating condition in which the thermal load of the cycle is relatively low, for example, at a low outside air temperature. For this reason, the refrigerant cannot flow into the evaporator, which might make it impossible to cool the ventilation air by the evaporator 14.

On the other hand, in the ejector refrigeration cycle device 10 of this embodiment, during the low outside-air temperature operation as explained in the description of the control step S93, the grille shutter 16 decreases the air passage area of the outside-air passage, thereby decreasing the amount of heat dissipated from the high-pressure refrigerant in the radiator 12, compared with in the normal operation. Thus, as shown in the Mollier diagram indicated by a thick solid line of FIG. 6, the high-pressure side refrigerant pressure in the cycle is increased, so that the pressure of the inflow refrigerant (as indicated by point b6 in FIG. 6) flowing into the refrigerant inflow port 31a of the ejector module 13 can be increased.

Figure 6:
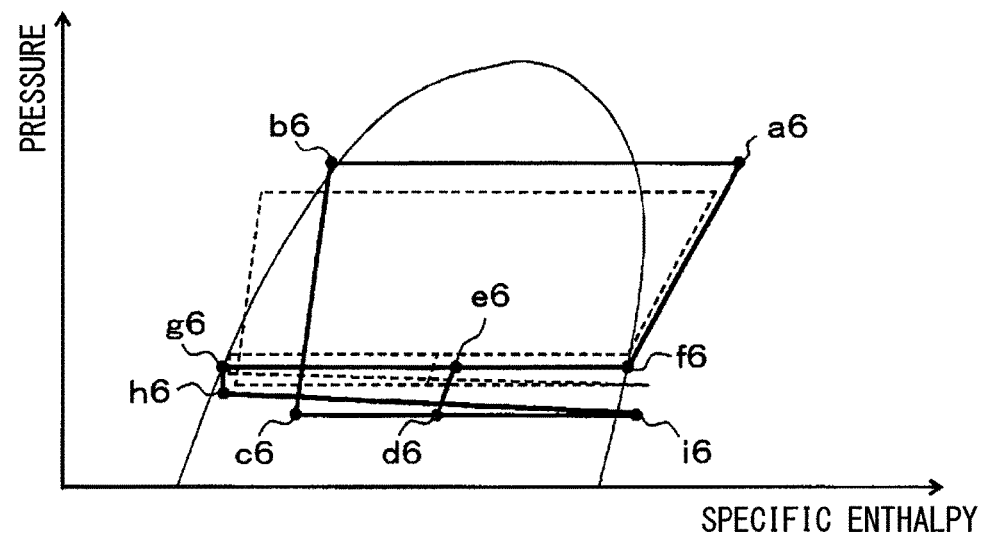
FIG. 6 is a Mollier diagram showing the states of the refrigerant during a low outside-air temperature operation of the ejector refrigeration cycle device in the first embodiment.

Note that as compared to the Mollier diagram of FIG. 5, which has been described as the normal operation, reference characters indicative of the states of the refrigerant in the Mollier diagram of FIG. 6 use the same alphabet to show the state of the refrigerant in the equivalent position of the cycle configuration, but alter only subscripts (numbers) added to the same alphabet in use. That is, points a6 to i6 in FIG. 6 correspond to the operation states shown by points a5 to i5 in the Mollier diagram of FIG. 5, respectively. The same goes for the following Mollier diagram. Other functions in the low outside-air temperature operation are the same as those in the normal operation.

Thus, even under low outside air temperatures at which the thermal load on the cycle tends to decrease, the flow velocity of the injection refrigerant injected from the nozzle passage 13a can be prevented from decreasing. Accordingly, even in the ejector refrigeration cycle device 10 that allows the subcooled liquid-phase refrigerant to flow into the nozzle passage 13a during the normal operation, the suction capacity of the ejector module 13 can be prevented from decreasing at a low outside air temperature.

That is, the ejector refrigeration cycle device 10 in this embodiment allows the ejector module 13 to exhibit its suction capacity, and the evaporator 14 to cool the ventilation air, regardless of the operating conditions.

Second Embodiment

Figure 7:
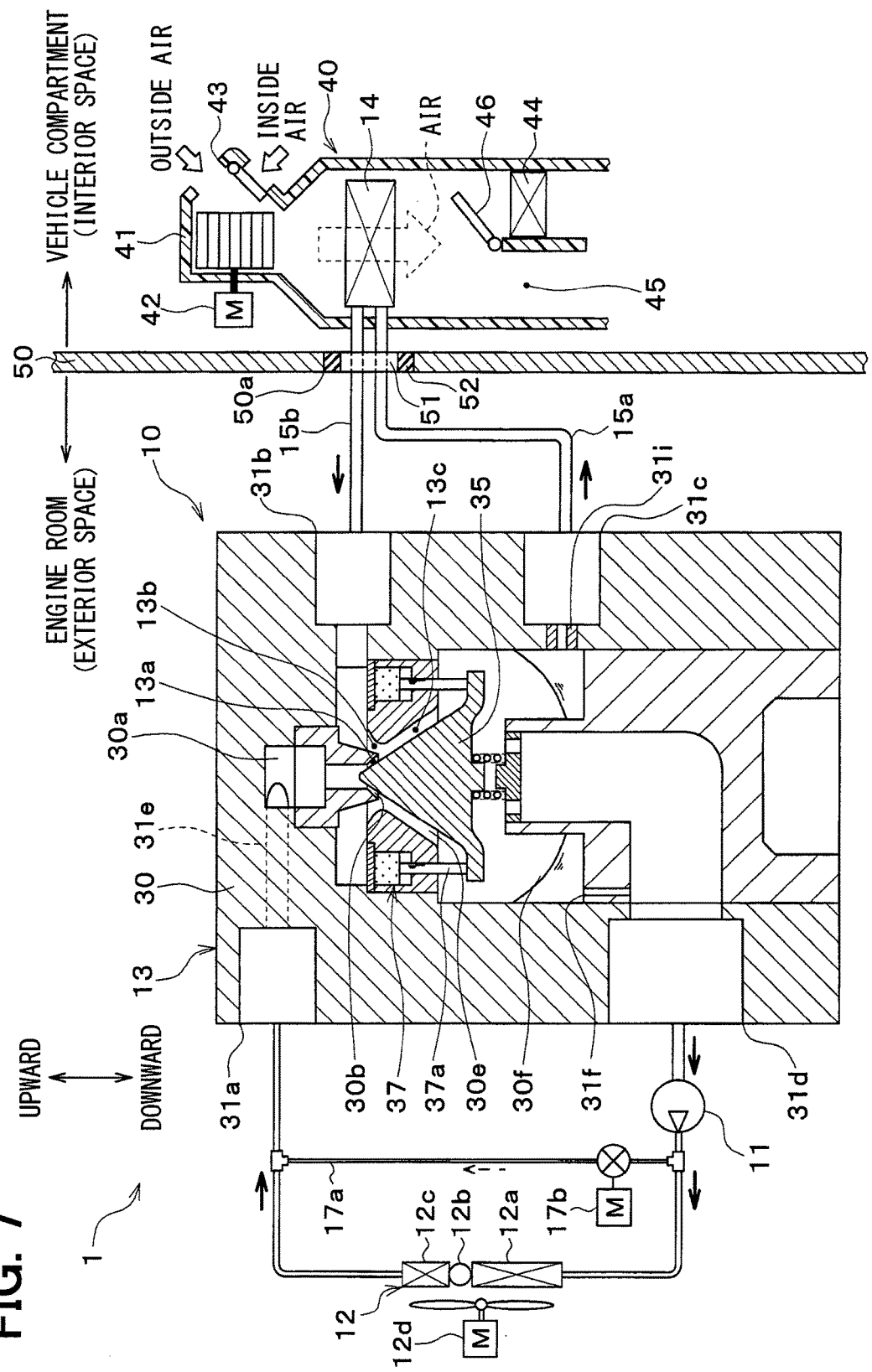
FIG. 7 is a schematic entire configuration diagram of a vehicle air conditioner to which an ejector refrigeration cycle device according to a second embodiment is applied.

In this embodiment, as shown in the entire configuration diagram of FIG. 7, the grille shutter 16 is abolished, while a bypass passage 17a and an on/off valve 17b are provided by way of example, compared to the first embodiment. The bypass passage 17a serves to cause the high-pressure refrigerant discharged from the compressor 11 to bypass the radiator 12 and then to guide the refrigerant to the refrigerant inflow port 31a side of the ejector module 13. The on/off valve 17b serves to open and close the bypass passage 17a.

In more detail, when the on/off valve 17b opens the bypass passage 17a, the ejector refrigeration cycle device 10 in this embodiment can guide the high-pressure gas-phase refrigerant discharged from the compressor 11 to the downstream side of the radiator 12 as indicated by a dashed arrow in FIG. 7. Then, the high-pressure gas-phase refrigerant is mixed into the subcooled liquid-phase refrigerant flowing out of the radiator 12, which can increase the enthalpy of the inflow refrigerant flowing from the refrigerant inflow port 31a of the ejector module 13 into the nozzle passage 13a side.

Furthermore, in the ejector refrigeration cycle device 10 of this embodiment, the passage cross-sectional area of each of the bypass passage 17a and on/off valve 17b is set such that the inflow refrigerant is brought into a state of having the vapor quality of 0 or more, that is, into a saturated liquid-phase state or gas-liquid two-phase state, when the on/off valve 17b opens the bypass passage 17a.

Thus, the bypass passage 17a and on/off valve 17b in this embodiment configure a vapor-quality increasing portion. In more detail, the on/off valve 17b configures a bypass flow-rate adjusting portion that adjusts the bypass flow rate of the high-pressure refrigerant circulating through the bypass passage 17a.

Figure 8:
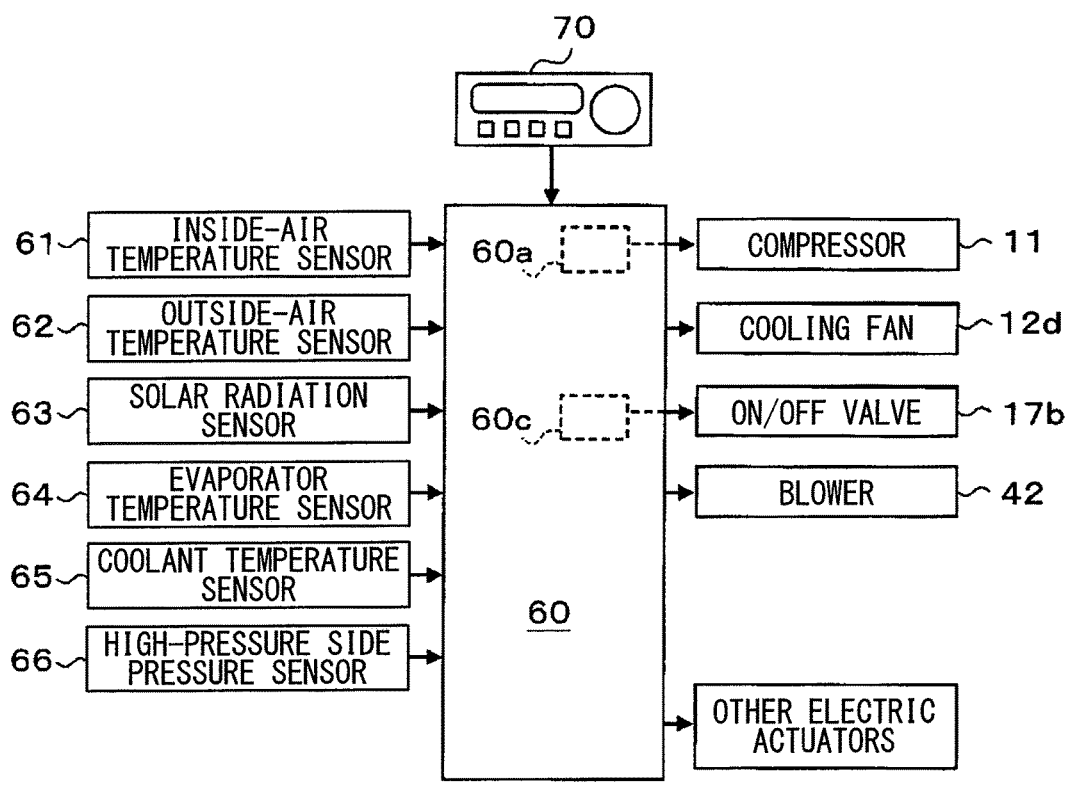
FIG. 8 is a block diagram showing an electric control unit of the vehicle air conditioner in the second embodiment.

The on/off valve 17b has its operation controlled by a control voltage output from the controller 60. Thus, as shown in the block diagram of FIG. 8, the output side of the controller 60 in this embodiment is connected to the on/off valve 17b. Further, in this embodiment, the structure for controlling the operation of the on/off valve 17b serving as the vapor-quality increasing portion configures a vapor-quality control unit 60c. The structures of other components are the same as those in the first embodiment.

Figure 9:
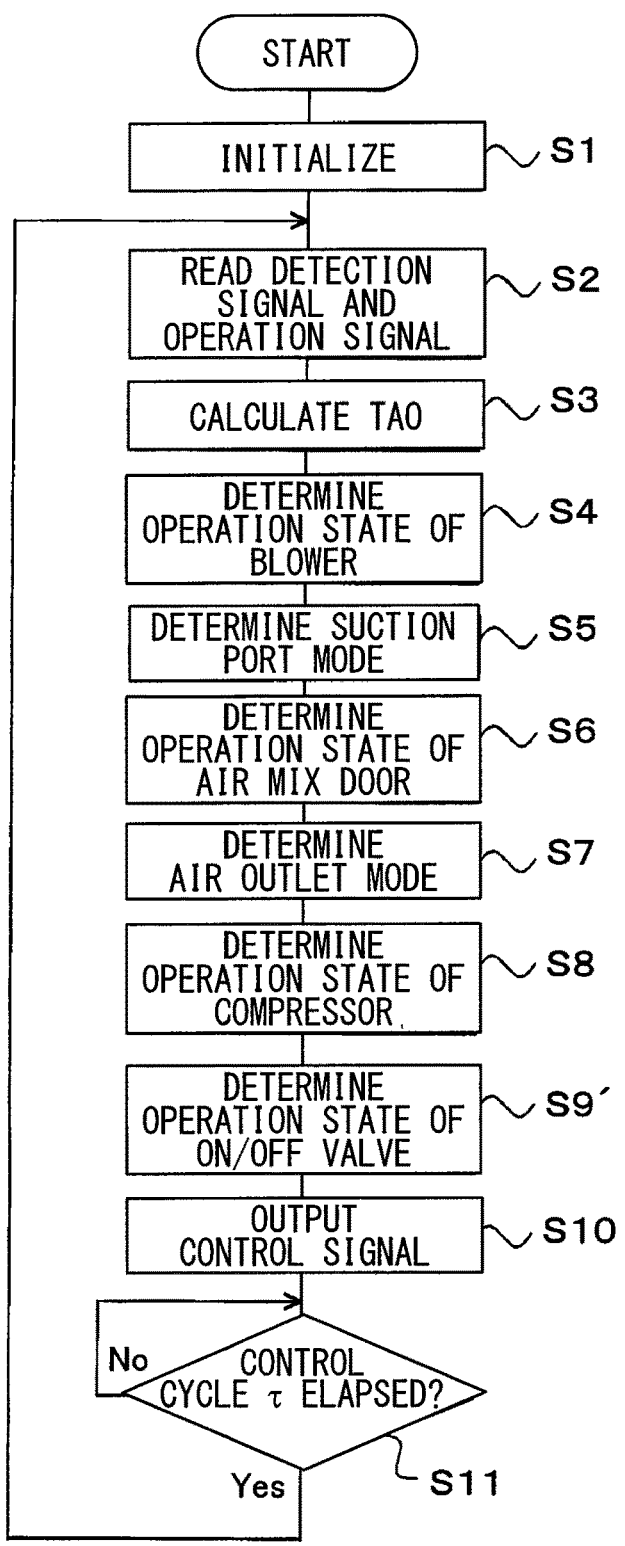
FIG. 9 is a flowchart showing control processing for the vehicle air conditioner in the second embodiment.

In the vehicle air conditioner 1 of this embodiment, in control step S9' of the flowchart shown in FIG. 9, the operation state of the on/off valve 17b is determined. Specifically, in step S9', the on/off valve 17b is closed in the operation state of the normal operation when the outside air temperature Tam is higher than the reference outside air temperature KTam. On the other hand, the on/off valve 17b is opened in the operation state of the low outside-air temperature operation when the outside air temperature Tam is equal to or lower than the reference outside air temperature KTam.

The operations of other components are the same as those in the first embodiment. Thus, during the normal operation, the vehicle air conditioner 1 of this embodiment can operate in the substantially same manner as in the first embodiment, and thus can obtain the same effects as those in the first embodiment while performing air-conditioning of the vehicle interior.

During the low outside-air temperature operation, the on/off valve 17b opens the bypass passage 17a. Thus, as shown in the Mollier diagram of FIG. 10, the subcooled liquid-phase refrigerant flowing out of the radiator 12 (as indicated at point b10 in FIG. 10) is merged with a high-pressure gas-phase refrigerant flowing out of the bypass passage 17a. Thus, the inflow refrigerant flowing from the refrigerant inflow port 31a into the nozzle passage 13a side in the ejector module 13 becomes the gas-liquid two-phase refrigerant (as indicated at point b'10 in FIG. 10).

Figure 10:
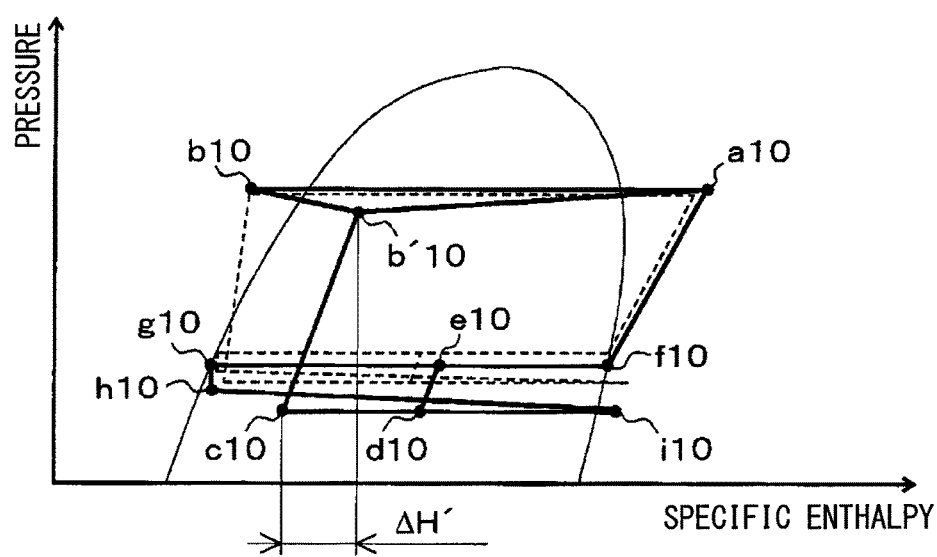
FIG. 10 is a Mollier diagram showing the states of the refrigerant during a low outside-air temperature operation of the ejector refrigeration cycle device in the second embodiment.

As a result, as compared to in the normal operation, the slope of the isentropic line on the Mollier diagram becomes small, whereby the recovery energy amount (ΔH' shown in FIG. 10) in the ejector module 13 can be increased. The subsequent operation is the same as that during the low outside-air temperature operation in the first embodiment. Note that like FIGS. 5 and 6, the Mollier diagram indicated by a dashed line in FIG. 10 shows the states of the refrigerant obtained when the normal operation is executed at a low outside air temperature. Points a10 to i10 in FIG. 10 correspond to the operation states shown by points a5 to i5 in the Mollier diagram of FIG. 5, respectively.

Therefore, the ejector refrigeration cycle device 10 of this embodiment increases the recovery energy amount in the ejector module 13, even under a low outside air temperature at which the thermal load on the cycle tends to decrease, thereby making it possible to suppress the reduction in the suction capacity of the ejector module 13.

That is, the ejector refrigeration cycle device 10 in this embodiment allows the ejector module 13 to exhibit its suction capacity, regardless of the operating conditions, thereby enabling the evaporator 14 to cool the ventilation air.

Other Embodiments

The present disclosure is not limited to the above-mentioned embodiments, and various modifications and changes can be made to those embodiments in the following way without departing from the scope and spirit of the present disclosure.

(1) In the above-mentioned embodiment, a subcool condenser is employed as the radiator 12 by way of example. However, the radiator 12 is not limited thereto as long as it has the structure that brings the inflow refrigerant flowing into the nozzle passage 13a side of the ejector module 13 into a subcooled liquid-phase state during the normal operation when the outside air temperature Tam is higher than the reference outside air temperature KTam.

For example, an internal heat exchanger may be employed that exchanges heat between the high-pressure refrigerant flowing out of the radiator 12 and the low-pressure refrigerant in the cycle (for example, the suction refrigerant drawn into the compressor). In this case, the radiator 12 adopts a standard radiator configured of only the condensing portion 12a. Further, a reservoir (receiver) may be employed along with the standard radiator. The reservoir separates the refrigerant dissipating its heat in the radiator, into gas and liquid phase refrigerants, and stores an excessive liquid-phase refrigerant.

As the inflow-pressure increasing portion, a heat-exchange amount adjustment portion may be employed to change the amount of heat exchange between the high-pressure and low-pressure refrigerants in the internal heat exchanger. Such a heat-exchange amount adjustment portion can adopt a flow-rate adjustment valve or the like that decreases the flow rate of the low-pressure refrigerant circulating through a low-pressure side refrigerant passage of the internal heat exchanger during the low outside-air temperature operation.

In the above-mentioned first embodiment, the grille shutter 16 configures the inflow-pressure increasing portion by way of example. Alternatively, the cooling fan 12d may configure the inflow-pressure increasing portion. In this case, the blowing capacity of the cooling fan 12d may be decreased during the low outside-air temperature operation. Note that the use of the cooling fan 12d as the inflow-pressure increasing portion is very effective when applying the ejector refrigeration cycle device of the present disclosure to a stationary system.

(2) In the above-mentioned first embodiment, the pressure of the inflow refrigerant is increased by the grille shutter 16 by way of example. Alternatively or additionally, the opening degree of the grille shutter 16 may be adjusted to convert the inflow refrigerant into one having a vapor quality of 0 or more. In this way, the grille shutter 16 can also configure the vapor-quality increasing portion.

In the above-mentioned second embodiment, the bypass passage 17a and the on/off valve 17b configure the vapor-quality increasing portion. However, the vapor-quality increasing portion is not limited thereto by way of example. For example, in place of the on/off valve 17b, the flow-rate adjustment valve capable of adjusting the refrigerant passage area may be adopted as the bypass flow-rate adjustment portion. The refrigerant passage area of the flow-rate adjustment valve may be increased with decreasing outside air temperature.

(3) Respective components forming the ejector refrigeration cycle device 10 are not limited to those disclosed in the above-mentioned embodiments.

For example, the above-mentioned embodiments employ the variable displacement compressor as the compressor 11, but the compressor 11 is not limited thereto. The compressor 11 for use may be a fixed displacement compressor that is driven by a rotational driving force output from the engine via an electromagnetic clutch, a belt, etc.

The fixed displacement compressor may adjust the refrigerant discharge capacity by changing an operating rate of the compressor through switching between the connection and disconnection of the electromagnetic clutch. The compressor 11 for use may be an electric compressor that adjusts the refrigerant discharge capacity by changing the number of revolutions of the electric motor.

The respective components forming the ejector module 13 are not limited to those disclosed in the above-mentioned embodiments. For example, the components of the ejector module 13, including the body portion 30 and the passage formation member 35, are made of metal, but are not limited thereto and may alternatively be formed of resin.

Further, in the ejector module 13 of the above-mentioned embodiments, the orifice 31i is provided by way of example. However, the orifice 31i may be abolished, and a decompression device may be disposed in the inlet pipe 15a. Such decompression devices suitable for use can include an orifice and a capillary tube.

Further, the above-mentioned embodiments employ the ejector module 13 of the gas-liquid separator integrated ejector by way of example. However, it is obvious that a standard ejector that does not include a gas-liquid separator integrated therewith may be employed as the ejector.

(4) In the above-mentioned embodiments, the ejector module 13 is disposed within the engine room by way of example, but may be disposed on the vehicle interior side relative to the firewall 50.

Further, the ejector module 13 may be disposed on the inner peripheral side of the through hole 50a of the firewall 50. In this case, a part of the ejector module 13 is disposed on the engine room side, and the other part is disposed on the vehicle interior side. Thus, a packing exhibiting the same function as in the first embodiment is desirably disposed in a gap between the outer peripheral side of the ejector module 13 and the opening edge of the through hole 50a.

(5) Although in the above-mentioned embodiments, the ejector refrigeration cycle device 10 according to the present disclosure is applied to the vehicle air conditioner 1 by way of example, the applications of the ejector refrigeration cycle device 10 in the present disclosure are not limited thereto. For example, the ejector refrigeration cycle device 10 may be applied to a refrigerator-freezer for a vehicle. The ejector refrigeration cycle device 10 is not limited to the application for vehicles, but may be applied to a stationary air conditioner, a cooling storage, and the like.

What is claimed is:

1. An ejector refrigeration cycle device, comprising:
a compressor that compresses and discharges a refrigerant;
a radiator that exchanges heat between the high-pressure refrigerant discharged from the compressor and outside air;
an ejector including a body portion, the body portion being provided with a nozzle portion that decompresses the refrigerant flowing out of the radiator, a refrigerant suction port that draws a refrigerant by a suction effect of injection refrigerant injected from the nozzle portion at a velocity, and a pressurizing portion that mixes the injection refrigerant with the suction refrigerant drawn from the refrigerant suction port to pressurize the mixed refrigerant;
an evaporator that evaporates the refrigerant, and allows the evaporated refrigerant to flow to the refrigerant suction port;
an outside air temperature detector that detects a temperature of the outside air;
an inflow-pressure increasing portion that increases a pressure of an inflow refrigerant flowing into the nozzle portion; and
a controller configured to control the pressure of the inflow refrigerant based on the temperature of the outside air detected by the outside air temperature detector, wherein
the controller controls the inflow refrigerant to be in a subcooled liquid-phase state at least when an outside air temperature detected by the outside air temperature detector is higher than a reference outside air temperature, and
the controller controls the inflow-pressure increasing portion to increase the pressure of the inflow refrigerant when the outside air temperature is equal to or lower than the reference outside air temperature.

2. The ejector refrigeration cycle device according to claim 1, wherein
the inflow-pressure increasing portion changes an amount of heat dissipation from the refrigerant in the radiator.

3. The ejector refrigeration cycle device according to claim 2, wherein
the inflow-pressure increasing portion changes the amount of heat dissipation by adjusting a volume of the outside air to be heat-exchanged with the high-pressure refrigerant in the radiator.

4. The ejector refrigeration cycle device according to claim 1, further comprising
a swirling-flow generating portion that generates a swirling flow in the refrigerant on a downstream side of the radiator and allows the generated swirling flow to flow into the nozzle portion.

5. An ejector refrigeration cycle device, comprising:
a compressor that compresses and discharges a refrigerant;
a radiator that exchanges heat between the high-pressure refrigerant discharged from the compressor and outside air;
an ejector including a body portion, the body portion being provided with a nozzle portion that decompresses the refrigerant flowing out of the radiator, a refrigerant suction port that draws a refrigerant by a suction effect of injection refrigerant injected from the nozzle portion at a velocity, and a pressurizing portion that mixes the injection refrigerant with the suction refrigerant drawn from the refrigerant suction port to pressurize the mixed refrigerant;
an evaporator that evaporates the refrigerant, allowing the evaporated refrigerant to flow out to the refrigerant suction port;
an outside air temperature detector that detects a temperature of the outside air;
a bypass passage through which the high-pressure refrigerant discharged from the compressor flows to an inlet side of the nozzle portion while bypassing the radiator;
a bypass flow-rate adjustment valve configured to adjust a bypass flow rate of the high-pressure refrigerant flowing through the bypass passage; and
a controller configured to control the pressure of the inflow refrigerant based on the temperature of the outside air detected by the outside air temperature detector, wherein
the controller controls the inflow refrigerant to be in a subcooled liquid-phase state at least when an outside air temperature detected by the outside air temperature detector is higher than a reference outside air temperature, and
the controller controls the bypass flow-rate adjustment valve such that the inflow refrigerant becomes in a state of having a vapor quality of 0 or more, when the outside air temperature is equal to or lower than the reference outside air temperature.

6. The ejector refrigeration cycle device according to claim 5, further comprising
a swirling-flow generating portion that generates a swirling flow in the refrigerant on a downstream side of the radiator and allows the generated swirling flow to flow into the nozzle portion.

7. An ejector refrigeration cycle device, comprising:
a compressor that compresses and discharges a refrigerant;
a radiator that exchanges heat between the high-pressure refrigerant discharged from the compressor and outside air;
an ejector including a body, the body being provided with a nozzle that decompresses the refrigerant flowing out of the radiator, a refrigerant suction port that draws a refrigerant by a suction effect of injection refrigerant injected from the nozzle at a velocity, and a passageway that mixes the injection refrigerant with the suction refrigerant drawn from the refrigerant suction port to pressurize the mixed refrigerant;
an evaporator that evaporates the refrigerant, and allows the evaporated refrigerant to flow to the refrigerant suction port;
an outside air temperature detector that detects a temperature of the outside air;
a grille shutter that increases a pressure of an inflow refrigerant flowing into the nozzle; and
a controller configured to control the pressure of the inflow refrigerant based on the temperature of the outside air detected by the outside air temperature detector, wherein
the controller controls the inflow refrigerant to be in a subcooled liquid-phase state at least when an outside air temperature detected by the outside air temperature detector is higher than a reference outside air temperature, and
the controller controls the grille shutter to increase the pressure of the inflow refrigerant when the outside air temperature is equal to or lower than the reference outside air temperature.

8. The ejector refrigeration cycle device according to claim 7, wherein
the grille shutter changes an amount of heat dissipation from the refrigerant in the radiator.

9. The ejector refrigeration cycle device according to claim 8, wherein
the grille shutter changes the amount of heat dissipation by adjusting a volume of the outside air to be heat-exchanged with the high-pressure refrigerant in the radiator.

10. The ejector refrigeration cycle device according to claim 7, wherein
the grille shutter includes a plurality of plate doors and an electric actuator for driving the grille shutter so as to rotatably displace the plurality of plate doors in cooperation with each other.

11. The ejector refrigeration cycle device according to claim 7, further comprising
a swirl space that generates a swirling flow in the refrigerant on a downstream side of the radiator and allows the generated swirling flow to flow into the nozzle.

12. The ejector refrigeration cycle device according to claim 11, wherein
the swirl space is substantially columnar shaped.

* * * * *